Jan. 16, 1951     D. R. ZUCK     2,538,224
WING WITH INTERCONNECTED FLAP AND NOSE SLAT
Filed Nov. 13, 1945     2 Sheets-Sheet 1
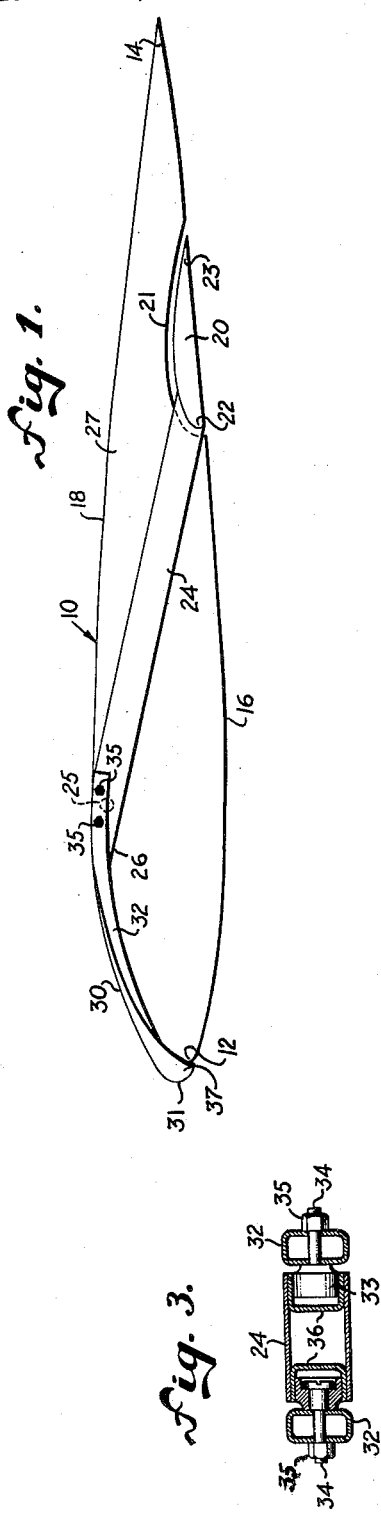
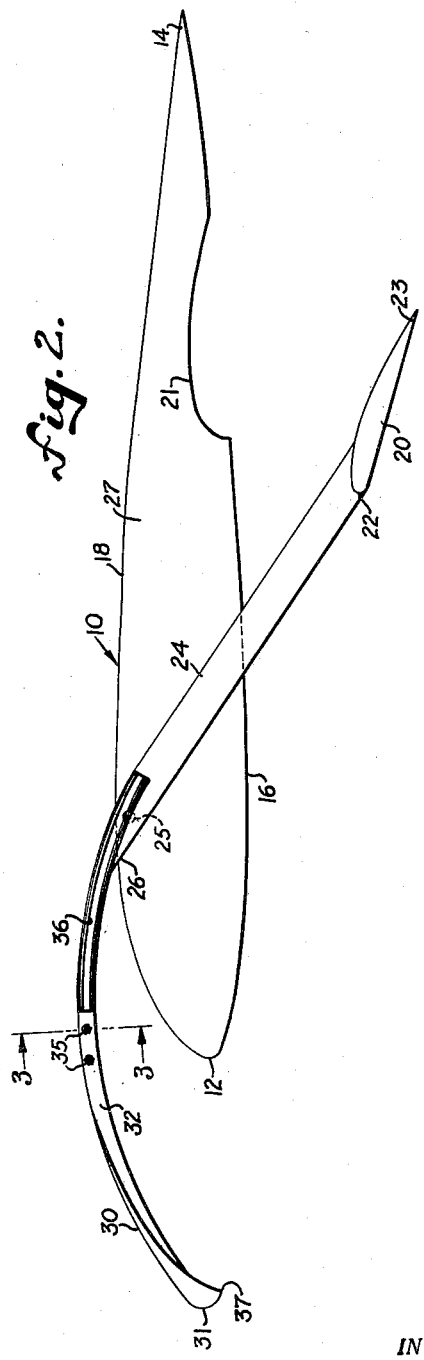
INVENTOR:
DANIEL R. ZUCK
BY
*Delbert A. Huebner*
ATTORNEY Jan. 16, 1951         D. R. ZUCK         2,538,224
WING WITH INTERCONNECTED FLAP AND NOSE SLAT
Filed Nov. 13, 1945                    2 Sheets-Sheet 2
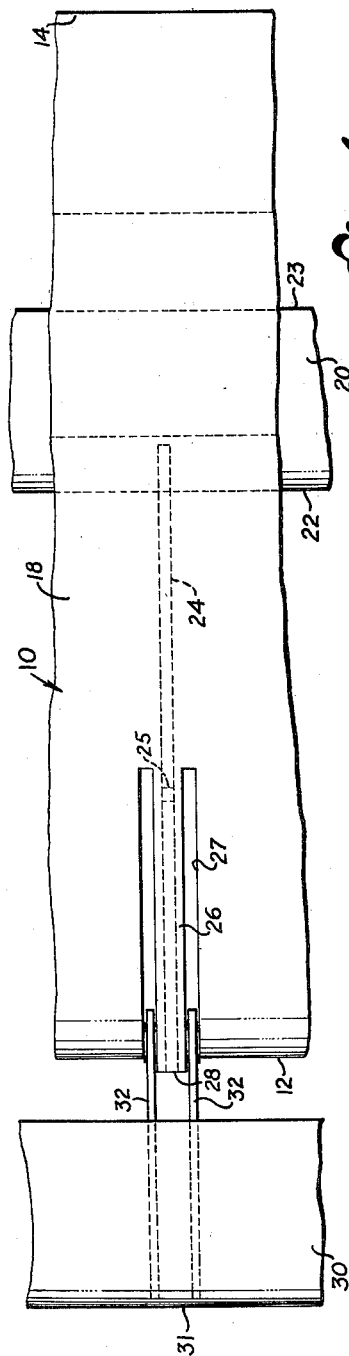
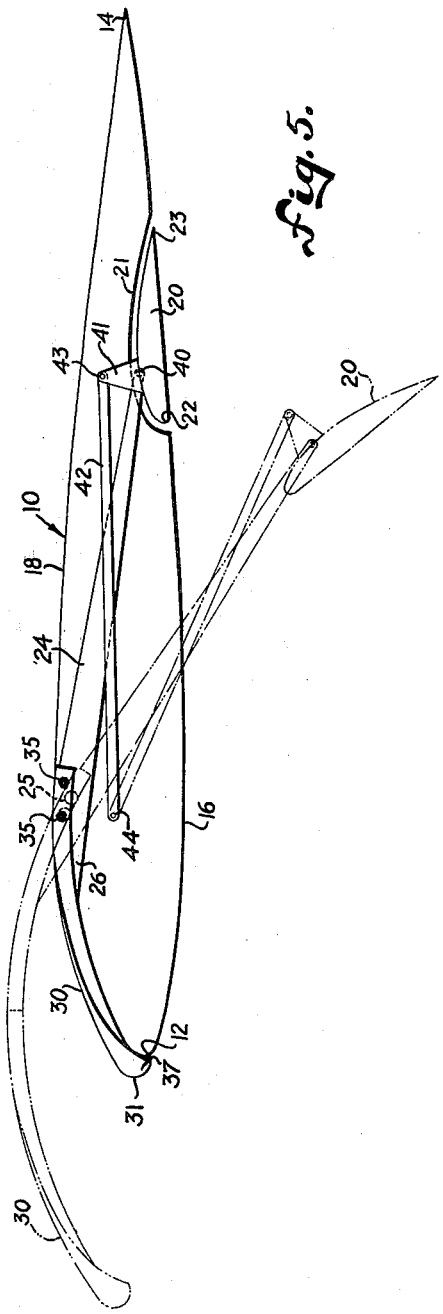
INVENTOR:
DANIEL R. ZUCK
BY
*Herbert A. Huebner*
ATTORNEY Patented Jan. 16, 1951

2,538,224

UNITED STATES PATENT OFFICE 2,538,224

WING WITH INTERCONNECTED FLAP AND NOSE SLAT

Daniel R. Zuck, Los Angeles, Calif.

Application November 13, 1945, Serial No. 628,093

9 Claims. (Cl. 244—42)

The invention relates to aircraft and has particular reference to a wing flap construction, automatic in its operation, which is adapted to vary the effect of the force of air upon the wing.

Although various types of wing flaps and slats have been known and used for a considerable time, operation of devices up to the present has resulted in a pitching moment on the wing. In the average type of aircraft a pitching moment arising from action of flaps or slats can be compensated for sufficiently so that the trim of the craft can be satisfactorily maintained. In certain types of aircraft, however, such for example, as the flying wing, and some other craft having specially designed wing structures, the balance of the wing is quite sensitive, making the conventional type of flap unsuitable and in fact even dangerous on some occasions.

It is, therefore, among the objects of the invention to provide a new and improved wing flap construction which when operated will eliminate or reduce undesirable pitching moment on the wing.

Another object of the invention is to provide a new and improved wing flap construction the action of which varies automatically with the angle of attack.

Still another object of the invention is to provide a new and improved combination wing flap and slat construction which is extendible automatically with changes in the angle of attack, the flap being positioned in operative relation with the wing by action of air pressure components on the slat.

A further object of the invention is to provide a new and improved flap and slat construction which is adapted to increase lift of the wing at lower speeds without producing an undesirable pitching moment upon the wing and which, if desired, may be automatically adjustable so that the positions of the flap and slat are shifted with relation to each other in different extended positions of the combination.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1 is a diagrammatic, cross-sectional view of an aircraft wing showing the location of the combined flap and slat in retracted position.

Figure 2 is a view similar to Figure 1 with the flap and slat in extended position.

Figure 3 is a cross-sectional view taken on the line 3—3 of Figure 2.

Figure 4 is a top view of a portion of the wing showing the location of the flap and slat.

Figure 5 is a view similar to Figure 1 showing a modified form of the device.

It is common practice in aircraft design to provide wing flaps which have a braking effect adapted to slow down the speed of the aircraft for the purpose of landing it without too long a run. Flaps are also used for increasing the lift of a wing under other circumstances while the plane is in flight. Combinations of wing flaps and the customary slats have also been attempted since the functions of both of these parts are inter-related. The chief difficulty accompanying the incorporation of wing flaps and slats in aircraft wings is the fact that sudden application of the flap or slat to the air stream has a marked tendency to alter the lift on a wing which results in a decided change of balance of the aircraft. Under some circumstances, the change of balance may be quite dangerous and detrimental to proper operation of the plane. In order to build into an aircraft wing a flap and slat construction which will produce little or no change in balance of the plane when their effect is suddenly applied, there necessitates a careful design involving factors not heretofore used or appreciated and incorporating a structure somewhat different from those heretofore employed for a similar purpose.

The principles incorporated in the design herein disclosed have been illustrated in somewhat diagrammatic form for the sake of simplicity, and details of wing structure and other structural features have been omitted.

In an embodiment chosen to illustrate the invention there is shown an aircraft wing 10 having a leading edge 12 and a trailing edge 14. In this particular embodiment the wing has an outwardly curved, lower surface 16, as well as a curved upper surface 18. A fragment only of the wing 10 is shown in Figure 4, but a sufficient portion is included to illustrate the location and attachment to the wing of the combination flap and slat construction comprising the invention.

Flap 20 is herein illustrated received within a recess 21 on the underside of the wing adjacent the trailing edge which has a shape in conformance with the shape of that portion of the flap which fits into the recess. It will be noted that the flap has an air foil design curved on the top face and provided with a leading edge 22 and a trailing edge 23.

For mounting the flap upon the wing there is provided an arm 24 having one end attached to the leading edge of the flap. The arm extends through a suitable diagonally transverse slot or opening within the interior of the wing not identified by reference character and is pivotally secured to the wing adjacent the top surface by means of a pin or pivot 25. It is important to note that the point of attachment of the pivot is at the mean aerodynamic center or center of lift of the wing. Although this is the preferred location, some shift in the location of the pivot point may be desirable under certain conditions so that a specific, predetermined pitching moment may be incorporated into the construction.

The arm 24 has a forwardly extending portion 26 received within a slot 27 on the upper side of the wing adjacent the leading edge, the forward portion being designed to extend to a point 28 slightly beyond the leading edge. This forward portion is adapted to provide a mount for a slat 30. The slat 30, similar to the flap 20, extends longitudinally in the direction of the wing and is parallel to the wing and the flap. It will be noted that the slat is transversely curved and when in retracted position, as shown in Figure 1, has a forward edge 31 overlying the leading edge of the wing. The rearward edge of the slat extends rearwardly along the top curved forward portion of the wing to a position slightly in advance of the pivot point 25.

For connecting the slat to the forward portion 26 of the arm 24 the slat is provided with a pair of rearwardly directed, parallel extensions 32. The extensions are applied to the underside of the slat so that the forward ends of the extensions are adjacent the forward edge 31 of the slat, thus providing a support throughout the full width of the slat. Rollers 33 are mounted upon the rear ends of the extensions by means of bolts 34 and nuts 35. The rollers are preferably in pairs, a pair of rollers being located at the rear end of each of the extensions, one in advance of the other.

In the forward portion 26 of the arm is located a trackway comprising channelled tracks 36, one on each side of the arm, and having the same degree of curvature as the curved parallel extensions 32. The tracks are slightly wider than the rollers 33 so that the rollers are free to roll along from one end to the other of the tracks providing a transverse sliding connection between the slat and the flap.

In operation the combined flap and slat construction occupies initially a retracted position as shown in Figure 1. This will be the position whenever the angle of attack of the wing is low with the direction of the wind in substantial alignment with the chord of the wing section. As the angle of attack is increased the lift forces on the wing have a forward component which tends to force the slat forwardly and upwardly pushing it forward with relation to the arm 24. As the slat is forced forward the rollers roll forward in the tracks 36 until, at wide angles of attack, the slat occupies the position shown in Figure 2. The slat, however, may be successfully built so that all portions, including the lip 37, close to a full faired position with the wing surface in retracted position.

As the slat is drawn forwardly and upwardly it exerts a pivoting force upon the forward end of the arm 24 sufficient to move the flap 20 in a pivotal direction clockwise about the pivot point 25 as viewed in Figure 2 until in extreme extended position the flap occupies the position shown in Figure 2. The motion just described occurs when the angle of attack is positive and exceeds a certain limit. Lowering of the flap into the air stream is in proportion to the lift on the slat multiplied by the distance from the pivot point. Since in the embodiment illustrated the pivot point is on the center of lift, there will be no pitching moment transferred to the wing by action of the air stream upon the flap and slat combination. Although action of the air stream on the flap will tend to increase the lift on the wing, the aircraft can be trimmed so that the resultant effect when the force of lift is expended has the effect of slowing down forward motion of the plane.

When the angle of attack changes to one below a certain positive value, the forward component of air pressure on the underside of the flap will be reduced to a point permitting the slat to be pushed rearwardly. The rollers will then travel rearwardly in the tracks 36 until the slat is finally pushed back to its original position shown in Figure 1. Simultaneously, the flap will be pushed upwardly until it finds a faired position within the recess provided for it on the lower side of the wing. Where desired, some locking means, not shown, may be provided for retaining the flap and slat combination in retracted or faired position should it be desired to retain flap action inoperative throughout changes of the angle of attack of the wing.

In the modified form shown in Figure 5 the principle of operation of the combined flap and slat is essentially the same as described in connection with the forms shown in Figures 1 and 2. In the modified form, however, the flap is permitted an articulation relative to the arm 24. To accomplish this the flap has a pivotal connection 40 at its top face to the rearward end of the arm. A bracket 41 is likewise mounted on the top face of the flap extending into a suitable recess in the wing. A lever 42 has its rearward end pivotally secured by means of a pin 43 to the top of the bracket and has a stationary pivotal connection 44 at its forward end to the interior of the wing.

In a construction of this kind when the flap is extended as shown by the dot-dash position of Figure 5, the flap is tilted with respect to the arm and the slat so that it extends at an increasingly greater angle downwardly as the flap is pushed by action of the slat outwardly into the air stream. By a construction of this kind an increased lift can be obtained when desired over that possible with the first construction described.

It is also possible with this arrangement to stabilize the position of the slat and flap extended with respect to the wing at a predetermined angle of attack of the wing. This is accomplished by a predetermined articulated motion which will produce a certain angle of incidence on the flap 20 at a predetermined distance from the lower surface 16 of the airfoil. Lowering of the flap 20 from a predetermined extended position will rapidly change the angle of incidence of the flap thereby changing the angle of attack and lift on the flap and thus overbalancing the lift of slat 30 and forcing the flap back into its predetermined extended position. Likewise the raising of the flap 20 from a predetermined extended position will rapidly reduce the incidence thereby reducing the angle of attack and lift of the flap. Consequent overbalancing by the slat 30 again restores the flap to its predetermined extended position.

By the simple construction and arrangement herein described there has been provided a flap and slat combination which can be readily incorporated into an airplane wing and which is so designed that its action will not disturb balance of the wing, or if designed to produce some pitching moment on the wing, the moment can be carefully controlled so that the resultant effect can be readily adjusted depending upon the particular type of aircraft wing being used.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

1. A wing flap structure for an airplane wing comprising a longitudinally extending flap below the wing adjacent the trailing edge, a longitudinally extending slat above the wing and adjacent the forward edge, an arm extending through the wing having a pivot connection thereto, a slideable connection between the slat and the arm, and a connection between the flap and the arm rearward of the pivot connection, said flap and slat having outwardly extended positions at high angles of attack and inwardly retracted positions at low angles of attack.

2. A wing flap structure for an airplane wing comprising a longitudinally extending flap below the wing adjacent the trailing edge, a longitudinally extending slat above the wing and adjacent the forward edge, an arm extending through the wing having a pivot connection thereto adjacent the center of lift, a slideable connection between the slat and the arm forward of the pivot connection, and a fixed connection between the flap and the arm rearward of the pivot connection, said arm in company with the flap and slat having outwardly pivoted extended positions at high angles of attack and inwardly pivoted retracted positions at low angles of attack.

3. A wing flap structure for an airplane wing comprising a flap extending longitudinally of the wing at the underside adjacent the trailing edge, a slat extending longitudinally of the wing at the upper side in a position wherein one side edge overlies the leading edge of the wing sufficient to provide a narrow protrusion, and a sliding connection between the flap and the slat pivotally secured to the wing adjacent the center of lift, said sliding connection having a forward position at high angles of attack of said wing wherein the arm is pivoted to a position extending the flap outwardly and a rear position at low angles of attack wherein the arm is pivotally retracted to a position in which the slat and flap are snug against the wing.

4. A wing flap structure for an airplane wing comprising a flap extending longitudinally of the wing at the underside adjacent the trailing edge, a slat extending longitudinally of the wing at the upper side, said slat being curved transversely to a shape wherein when in normal position one side overlies the leading edge sufficient to provide a narrow protruding portion and the other side extends rearwardly, a connection between the flap and the slat comprising an arm extending through the wing and pivotally secured thereto adjacent the center of lift, means for attaching the forward edge of the flap to the rear end of the arm, a forward portion of the arm having a laterally disposed slideway member, said slat having a rearwardly directed extension incorporating a slideway member complementary to the first slideway member and a sliding engagement therebetween, said sliding engagement having a forward position at high angles of attack wherein the arm is pivoted to a position extending the flap outwardly and a rear position at low angles of attack wherein the arm is pivotally retracted to a position in which the slat and flap are snug against the wing.

5. A wing flap structure for an airplane wing comprising a flap extending longitudinally of the wing at the underside adjacent the trailing edge, said wing having a recess adapted to receive the flap in faired position, a slat extending longitudinally of the wing at the upper side, said slat being curved transversely to a shape wherein when in normal position the front edge overlies the leading edge sufficient to provide a narrow protrusion, a connection between the flap and the slat comprising an arm extending through the wing and pivotally secured thereto adjacent the center of lift, means for attaching the flap to the rear end of the arm, a forward portion of the arm having a laterally disposed recessed trackway extending lengthwise throughout the forward portion, said slat having rearwardly directed parallel extensions normally positioned along the sides of the arm and roller means rotatably mounted on each extension having a rolling engagement with the trackway, said roller means having a forward position in the trackway at high angles of attack wherein the arm is pivoted to a position extending the flap outwardly and a rear position in the trackway at low angles of attack wherein the arm is pivotally retracted to a position in which the slat and flap are snug against the wing.

6. A wing flap structure for an airplane wing comprising a flap extending longitudinally of the wing at the underside adjacent the trailing edge, said wing having a recess adapted to receive the flap in faired position, a slat extending longitudinally of the wing at the upper side, said slat being curved transversely to a shape wherein when in normal position one side edge overlies the leading edge sufficient to provide a narrow protruding lip and the other side extends rearwardly to a location nearer the pitching center, a diagonally transverse opening through the wing, a connection between the flap and the slat comprising an arm extending through the wing opening and pivotally secured to the wing at the center of lift, means for attaching the forward edge of the flap to the rear end of the arm, a portion of the arm forward of the center of lift having parallel, lateral, recessed tracks extending lengthwise throughout the forward portion, said slat having a pair of parallel extensions spanning the under surface of the slat having protruding portions normally positioned along the sides of the arm and a pair of rollers rotatably mounted on each extension having a rolling engagement with the respective tracks, said rollers having a forwardmost position in the tracks at high angles of attack of said wing wherein the arm is pivoted to a position extending the flap outwardly and a rearmost position in the tracks at low angles of attack wherein the arm is pivotally retracted to a position in which the slat and flap are snug against the wing.

7. A wing flap structure for an airplane wing comprising a flap extending longitudinally of the wing at the underside adjacent the trailing edge, a slat extending longitudinally of the wing at the upper side in a position wherein one side edge overlies the leading edge of the wing sufficient to provide a narrow protrusion, a sliding connection between the flap and the slat pivotally secured to the wing adjacent the center of lift, means for attaching the flap to the wing comprising a pivot connection between the rear end of the sliding connection and the flap and a lever pivotally secured at one end to the flap at a point adjacent the first connection and at the other end to the wing, said connections being adapted to tilt the flap downwardly relative to the arm in extended position, said sliding connection having a forward position at high angles of attack of said wing wherein the arm is pivoted to a position extending the flap outwardly and a rear position at low angles of attack wherein the arm is pivotally retracted to a position in which the slat and flap are snug against the wing.

8. A wing flap structure for an airplane wing comprising a flap extending longitudinally of the wing at the underside adjacent the trailing edge, a slat extending longitudinally of the wing at the upper side, said slat having a normal position wherein one side overlies the leading edge sufficient to provide a narrow protrusion, a connection between the flap and the slat comprising an arm extending through the wing and pivotally secured thereto adjacent the center of lift, means for attaching the flap to the rear end of the arm comprising a pivot connection between the end of the arm and the flap, and a lever pivotally secured at one end to the flap at a point spaced from the first connection and at the other end to the midportion of the wing, said lever being adapted to tilt the flap downwardly relative to the arm in extended position, said slat having a rearwardly directed extension normally positioned at the side of the arm and a longitudinally movable connection between the extension and the arm, said connection having a forward position at high angles of attack.

9. A wing flap structure for an airplane wing comprising a flap extending longitudinally of the wing at the underside adjacent the trailing edge, said wing having a recess adapted to receive the flap in faired position, a slat extending longitudinally of the wing at the upper side, said slat being curved transversely to a shape wherein when in normal position one side overlies the leading edge sufficient to provide a narrow protrusion and the other side extends rearwardly to a line adjacent the pitching center, a connection between the flap and the slat comprising an arm extending through the wing and pivotally secured thereto adjacent the center of lift, means for attaching the forward edge of the flap to the rear end of the arm comprising a pivot connection between the end of the arm and the upper face of the flap intermediate the forward and rear edges, a bracket on the upper face of the flap and a lever pivotally secured at one end to the end of the bracket and at the other end to an inner portion of the wing adapted to tilt the flap downwardly relative to the arm in extended position, a portion of the arm forward of the center of lift having parallel, lateral, recessed tracks extending lengthwise throughout the forward portion, said slat having a pair of rearwardly directed parallel extensions normally positioned along the sides of the arm and a pair of rollers rotatably mounted on each extension having a rolling engagement with the respective tracks, said rollers having a forwardmost position in the tracks at high angles of attack of said wing wherein the arm is pivoted to a position extending the flap outwardly and downwardly and a rearmost position in the tracks at low angles of attack wherein the arm is pivotally retracted to a position in which the slat and flap are snug against the wing.

DANIEL R. ZUCK.

REFERENCES CITED

The following references are of record in the file of this patent:

UNITED STATES PATENTS

| Number | Name | Date |
| --- | --- | --- |
| 1,433,030 | Page | Oct. 24, 1922 |
| 1,501,523 | Clark | July 15, 1924 |
| 1,780,838 | Page | Nov. 4, 1930 |
| 1,800,746 | Page | Apr. 14, 1931 |
| 1,818,322 | Hall | Aug. 11, 1931 |
| 1,830,019 | Davis | Nov. 3, 1931 |
| 2,130,958 | Kramer | Sept. 20, 1938 |
| 2,222,935 | Chilton | Nov. 26, 1940 |
| 2,321,837 | Maxwell | June 15, 1943 |
| 2,416,958 | Sears | Mar. 4, 1947 |

FOREIGN PATENTS

| Number | Country | Date |
| --- | --- | --- |
| 518,670 | Great Britain | Mar. 5, 1940 |
| 522,296 | Great Britain | June 13, 1940 |